US008739580B2

(12) United States Patent  
Marioni (10) Patent No.: US 8,739,580 B2  
(45) Date of Patent: Jun. 3, 2014

(54) PULLEY ELECTRIC MOTOR FOR A WASHING MACHINE, ACTUATION SYSTEM FOR A WASHING MACHINE AND WASHING MACHINE

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 795 days.

(21) Appl. No.: 12/476,982

(22) Filed: Jun. 2, 2009

(65) Prior Publication Data

US 2009/0301142 A1 Dec. 10, 2009

(30) Foreign Application Priority Data

Jun. 4, 2008 (EP) ..................... 08425396

(51) Int. Cl.
*D06F 21/00* (2006.01)

(52) U.S. Cl.
USPC .......... 68/139; 68/12.01; 68/12.16; 68/12.19; 8/148; 15/3; 134/56 R; 134/57 R; 134/58 R; 134/184; 134/186

(58) Field of Classification Search
None
See application file for complete search history.

(56) References Cited

U.S. PATENT DOCUMENTS

| 4,580,421 A | 4/1986 | Babuin et al. |
| 5,887,456 A | 3/1999 | Tanigawa et al. |

FOREIGN PATENT DOCUMENTS

| DE | 1585817 A1 | 5/1971 |
| DE | 3321192 A1 | 12/1984 |
| DE | 3426470 A1 | 1/1986 |

*Primary Examiner* — Eric Golightly
(74) *Attorney, Agent, or Firm* — Akerman LLP (57) ABSTRACT

A pulley electric motor for a washing machine, comprising a stator, a rotor, electronic power circuitry for actuating the rotor, and electronic control circuitry for controlling both the electronic power circuitry to control movement of the rotor and a discharge electric pump of the washing machine. An actuation system for a washing machine is also described, comprising a pulley electric motor for the actuation of a washing drum and a discharge electric pump for discharging water, controlled by the electronic control circuitry, the pulley electric motor equipped with electronic control circuitry which also controls the discharge electric pump. Also described is a washing machine comprising a housing body for a rotary washing drum, a pulley electric motor connected to the drum through a kinematic belt/pulley coupling, a discharge electric pump, and electronic control circuitry for controlling the pulley electric motor. The electronic control circuitry also controls the discharge electric pump.

6 Claims, 8 Drawing Sheets

PULLEY ELECTRIC MOTOR FOR A WASHING MACHINE, ACTUATION SYSTEM FOR A WASHING MACHINE AND WASHING MACHINE

FIELD OF APPLICATION

The present invention refers to a pulley electric motor for a washing machine, to an actuation system for a washing machine and to a washing machine.

PRIOR ART

As is known, a washing machine normally has a box-shaped self-supporting body inside which a washing drum is actuated that rotates and is cylinder shaped and is accessible through a door in the washing machine to load the clothes to be washed.

Normally, the washing drum is actuated to rotate by means of a pulley electric motor that moves the washing drum through a belt/pulley kinematic coupling.

The pulley electric motor is preferably of the type synchronous with a permanent magnet rotor and with an inner stator fixedly connected to a fixed axis. The outer rotor, equipped with permanent magnets, surrounds the stator with spacing due to an air gap. The stator is equipped with polar expansions wrapped around with windings fed with power so as to impose a rotary magnetic field to the air gap; such a rotary magnetic field, interacting with the magnetism of the permanent rotor magnets, makes the rotor rotate.

The pulley electric motor is normally controlled by an inverter, fed with power by the external electrical network, in particular the alternating current electrical mains.

Normally, the pulley electric motor comprises electronic control circuitry, which is able to control the operation of the inverter to control the motion of the pulley electric motor. Such control can be carried out with a known position, torque or speed feedback; such feedback shall not be mentioned hereafter since it is not relevant for the purposes of the present invention.

Normally the washing machine comprises electronic programming and command circuitry capable of actuating specific operations by applying electrical signals to the electronic control circuitry of the pulley electric motor and also of receiving the commands given by the user through command means such as keys, knobs, ring nuts, levers, etc. The electronic programming and command circuitry often comprises a microprocessor device in which the washing programmes and the timing thereof are stored, so as to control the operation of the pulley electric motor according to a specific mode requested by the user.

Therefore, the electronic programming and command circuitry must normally communicate with the electronic control circuitry. It is also provided for information to be sent by the electronic programming and control circuitry to the electronic programming and command circuitry, for example to notify alarms or end of operation signals.

It is known that a washing machine often also comprises a discharge electric pump, which has the task of sucking out dirty water from the washing drum to return it to a waste water network. A discharge electric pump is normally equipped with an electric pumping motor capable of actuating an impeller. The electric pumping motor of the electric pump is preferably of the synchronous type comprising an internal permanent magnet rotor and an external stator wrapped with windings.

Electric pumps are known comprising both electronic power circuitry and electronic control circuitry, just as discharge electric pumps that are not normally provided with an inverter are also known. These discharge electric pumps are simpler and more cost-effective to manufacture, but they need particular provisions for example for mechanical starting.

A discharge pump must obtain commands from the electronic programming and command circuitry to start up or stop according to the washing programme preselected by the user.

Moreover, in some washing machine of particular design there are further electric pumps, for example known recirculation pumps to recirculate the water in the washing drum.

Therefore, we can consider a washing machine as provided with a cabled structure comprising a central unit (the electronic programming and command circuitry) and a plurality of peripherals including, at least, the electronic control circuitry of the pulley electric motor and the electronic control circuitry of the discharge electric pump.

The electronic programming and command circuitry must therefore be connected point-to-point with all of the peripheral units. This translates into a complexity in terms of the cabling required; this complexity is disadvantageous in a washing machine, which must be simple, cost-effective and reliable.

It should be noted that the electronic programming and command circuitry is normally arranged in the vicinity of the command means in a position at the top-front of the washing machine, whereas the discharge electric pump is often arranged in a position at the bottom-rear of the washing machine, with the pulley electric motor also often being arranged close to the electric pump, in a position substantially at the bottom-rear. The cabling necessary for electronic communication thus tends to look like a star network with the centre at the top-front and branches towards the bottom-rear position of the washing machine.

It should also be noted that not only are communication cables necessary, but also power supply cables, which need to have housing in the washing machine. The power supply cables are connected to the mains and run to the various electronic devices, contributing to making the overall cabling even more bulky.

The electronic power devices require a power supply at a voltage of the same value as the mains voltage (for example 220 V in single phase alternating current), whereas other electronic devices, such as the electronic control circuitry and the electronic programming and command circuitry, require a lower power supply, for example 12V in direct current, suitable for microprocessor systems: therefore, the power supply has to be carried to all of the electronic devices present, but each of these must take care of transforming, rectifying and stabilising the voltage to allow the operations of the microprocessors and of the other discrete devices, which must be insulated, stabilised, fed with power for example at 12V in direct current, etc.

The presence of some many electronic components, necessary for the power supply of the logic circuits, takes up already restricted spaces, such as the inside of the stator of an electric motor, which is already burdened by the presence of windings and the electronic power circuitry, which, what's more, additionally requires heat exchangers to dispose of the heat produced by the power circuits, making the coexistence of numerous electronic devices inside the same board even more complicated.

The technical problem forming the basis of the present invention is to devise a solution to remedy the aforementioned drawbacks.

SUMMARY OF THE INVENTION

The idea for a solution forming the basis of the present invention is to try to use the least possible number of electronic components inside the same washing machine.

Based upon such an idea for a solution, the technical problem is solved by a pulley electric motor for a washing machine, of the type comprising a rotor and a stator, said motor comprising both electronic power circuitry to actuate the rotor and electronic control circuitry to control the electronic power circuitry so as to control the movement of the rotor, wherein the electronic control circuitry is structured and configured to also control a discharge electric pump of the same washing machine.

Preferably, the pulley electric motor is of the synchronous type with permanent magnets.

Preferably, the pulley electric motor comprises an external rotor and an internal stator, with separation through an air gap, the external rotor being supported by the internal stator by interposition of bearings.

Preferably, the electronic power circuitry comprises a main inverter capable of actuating the rotor of the pulley electric motor and a secondary inverter for the actuation of the electric pump.

The invention also refers to an actuation system for a washing machine, comprising a pulley electric motor to make a clothes drum rotate and a discharge electric pump to discharge washing water, said pulley electric motor being equipped with electronic control circuitry structured and configured to also control said discharge electric pump of the same washing machine.

Preferably, the electric pump comprises a synchronous motor with internal permanent magnet rotor and coupled with an impeller.

Preferably, the electrical power supplied by an external electrical network is applied to an input of just the pulley electric motor, said electric pump being supplied with power through a secondary inverter of said structured electronic control circuitry; in this way, the electric pump does not need to be directly connected to the external electrical network.

The invention also concerns a washing machine comprising a housing body for housing a rotary washing drum, a pulley electric motor connected to said drum through a kinematic belt and pulley coupling, a discharge electric pump of the washing water and electronic control circuitry of the pulley electric motor, said electronic control circuitry being structured and configured to also control said discharge electric pump of the same washing machine.

Preferably, the washing machine according to the invention comprises electronic programming and command circuitry connected to command means that are accessible to a user (preferably, keys, knobs, ring nuts, levers); the electronic programming and command circuitry is able to impart operation commands to the electronic control circuitry.

Preferably, the washing machine is such that the electronic programming and command circuitry is arranged in a top-front position, so as to be near to the user command means; the electric pump is arranged in a bottom-rear position; the pulley electric motor is arranged in a bottom-rear position, above the electric pump.

The characteristics and advantages of the present invention shall become clearer from the following description of some preferred example embodiments, given for indicating and not limiting purposes with reference to the attached drawings.

DETAILED DESCRIPTION

Figure 6:
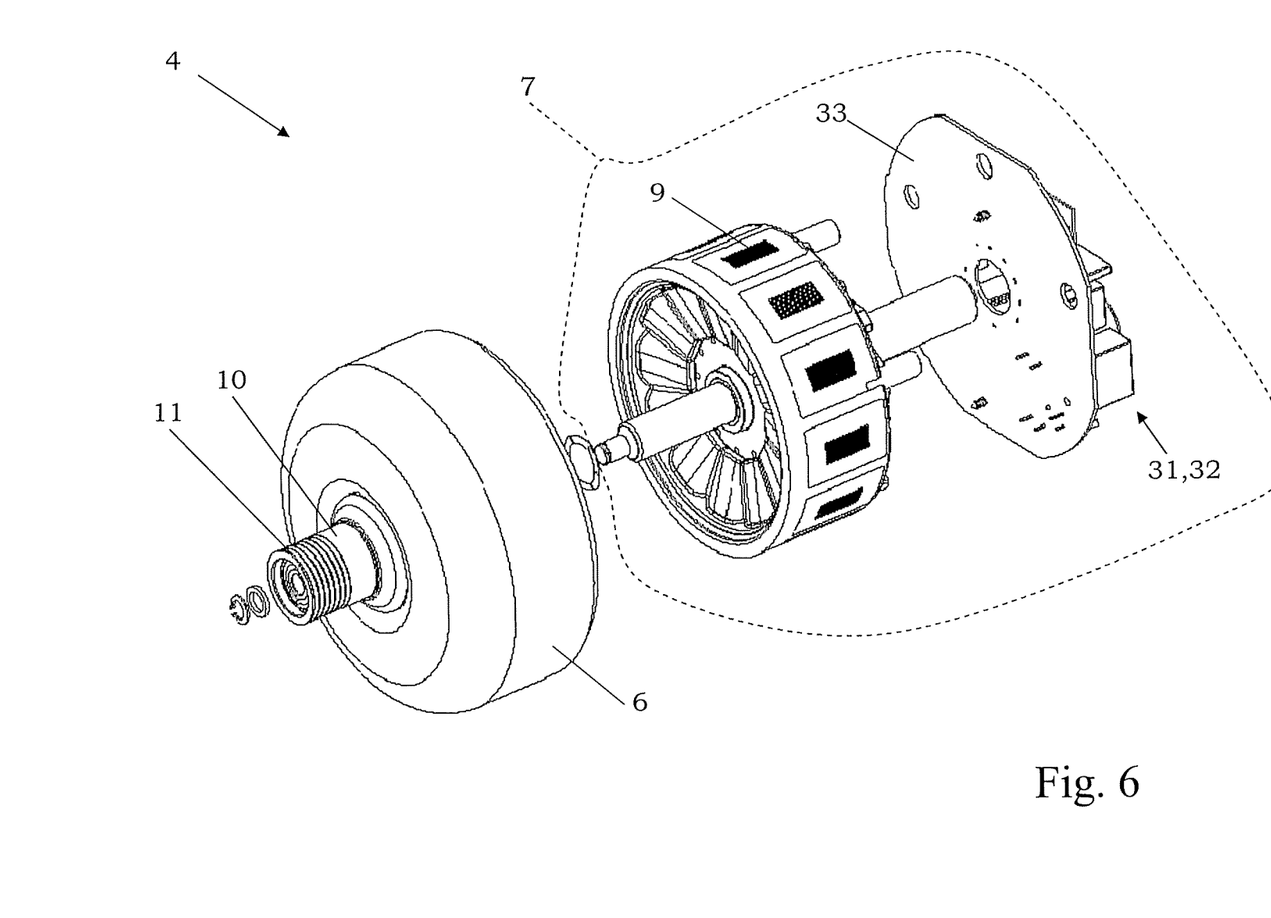
FIG. 6 shows an exploded view of a pulley electric motor according to the present invention.
Figure 7:
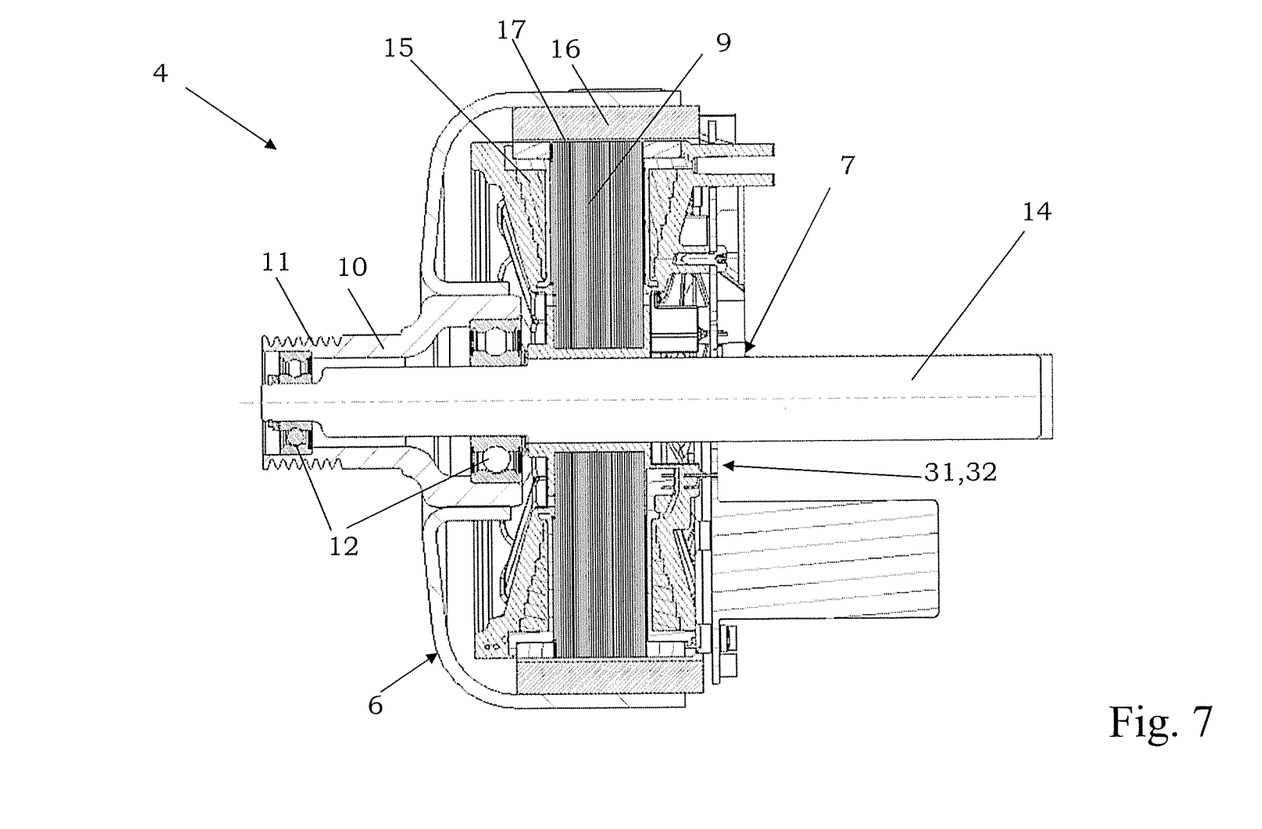
FIG. 7 shows an axial section view of the pulley electric motor of FIG. 6.
Figure 8:
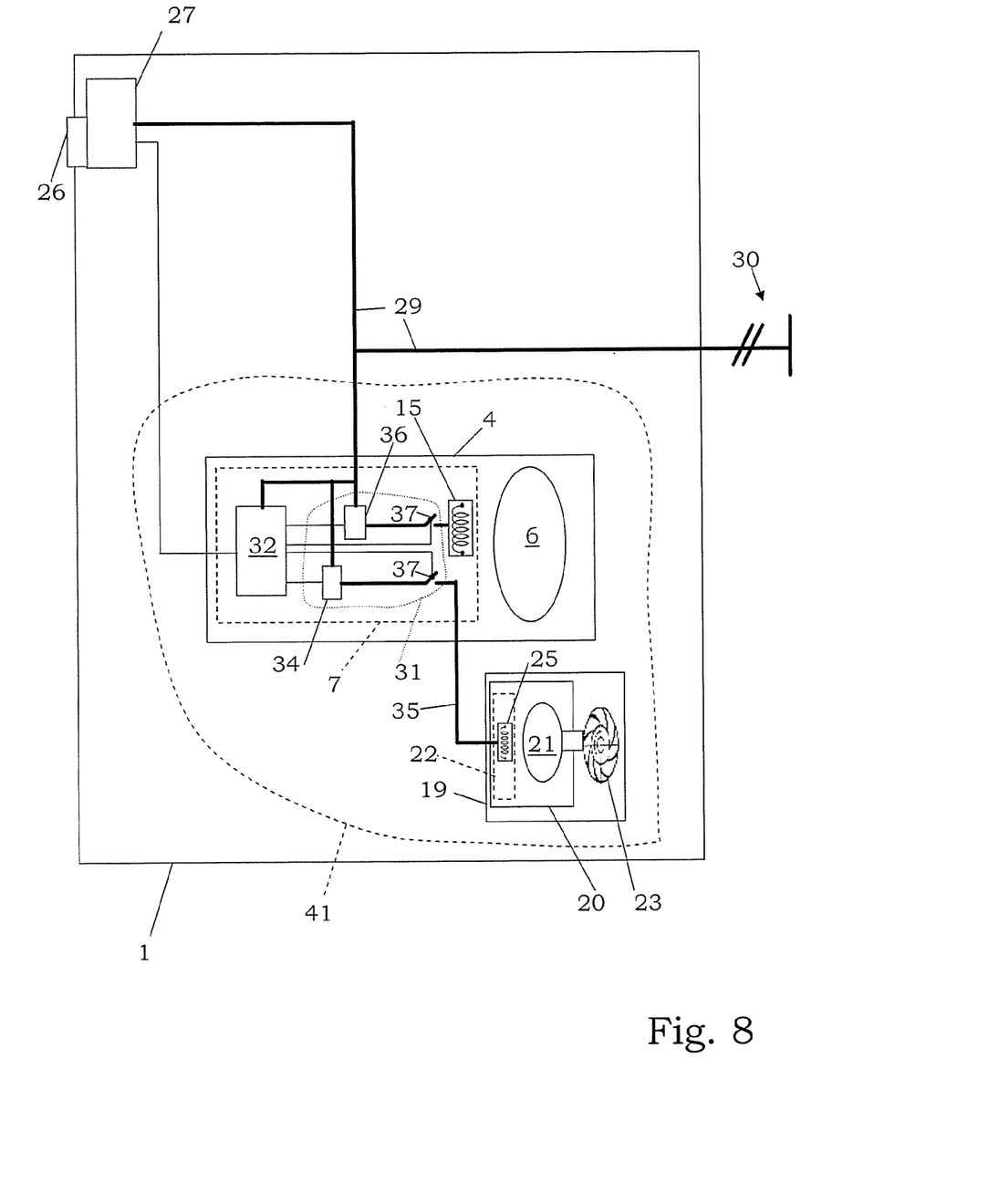
FIG. 8 shows an overall electric diagram of a washing machine according to the invention.

With reference to FIGS. 1-5, a washing machine 1 according to the invention is wholly described, which uses a pulley electric motor illustrated in detail in FIGS. 6 and 7; the overall diagram of the washing machine 1, on the other hand, is represented in FIG. 8.

The washing machine 1 comprises an essentially box-shaped or parallelepiped self-supporting body 2 made from metallic material for housing the components of the washing machine 1.

In the washing machine 1 a washing drum 3 is rotatably supported so as to be able to rotate inside a conventional washing tank. The washing machine 1 also comprises a pulley electric motor 4 for the rotation of the washing drum 3 and a kinematic belt/pulley coupling 5 for the transfer of motion from the motor 4 towards the washing drum 3.

The pulley electric motor 4 comprises an external rotor 6 of the type comprising permanent magnets 16 and an internal stator 7 equipped with windings.

The internal stator 7 is stably fixed to the washing machine 1 so as to be fixedly connected to the body 2; the stator 7 comprises a fixed axis 14 that supports the external rotor 6 by interposition of bearings 12.

The internal stator 7 comprises polar expansions 9 each formed from a corresponding plurality of piled up laminations. Each polar expansion 9 has a winding 15 wrapped around it for the generation of a magnetic field.

Between the permanent magnets 16 and the polar expansions 9 an air gap 17 is defined, which is a thin empty layer that is the location of a magnetic field induced by the polar expansions 9, the rotary magnetic field interacting with the magnetism of the permanent magnets 16 for the rotation of the external rotor 6.

The internal stator 7 comprises electronic power circuitry 31 for the actuation of the external rotor 6; normally, such electronic power circuitry 31 comprises a main inverter 36, for example comprising IGBT or other types of switches, connected in output from the windings 15, so as to generate magnetic fields rotating with variable speed at the air gap, so as to give the external rotor 6 different speeds.

Moreover, the internal stator 7 comprises electronic control circuitry 32 to control the electronic power circuitry 31 so as to control the movement of the external rotor 6, through known schemes and algorithms.

The electronic circuitries 31, 32 are supported by a stator board 33 that acts as a cover to close the internal stator 7.

The external rotor 6 is fixedly connected to a pulley 11. In the present embodiment, the external rotor 6 has a substantially cylindrical cup-shaped configuration with base wall shaped at the centre like a cylindrical funnel defining a hub 10, fixedly connected to the pulley 11 and able to act as a seat for bearings 12. In the present embodiment, the hub 10 and the pulley 11 are configured so as to house the bearings 12 on the inside.

Figure 1:
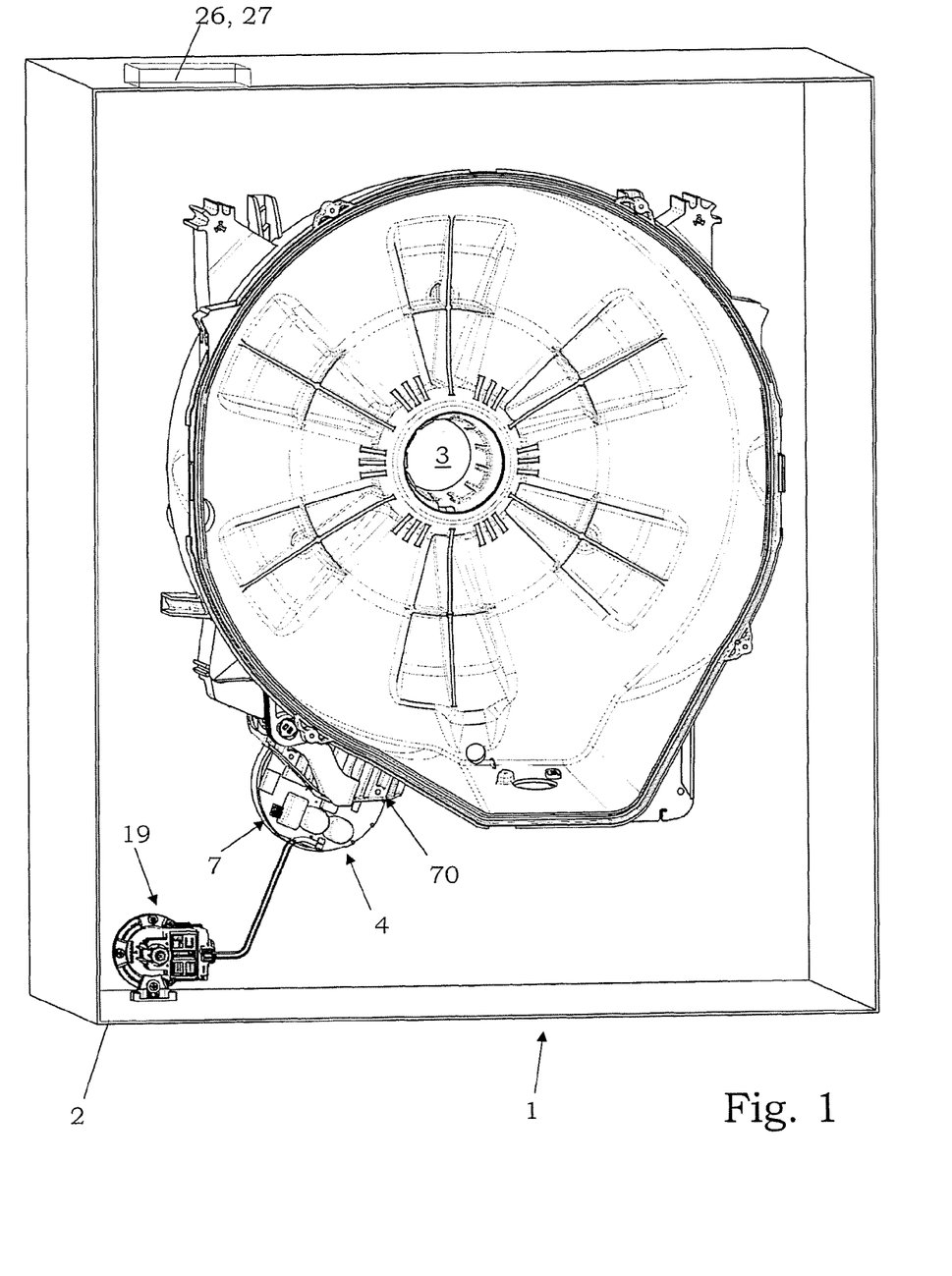
FIG. 1 shows a perspective view from the front of a washing machine according to the invention.
Figure 2:
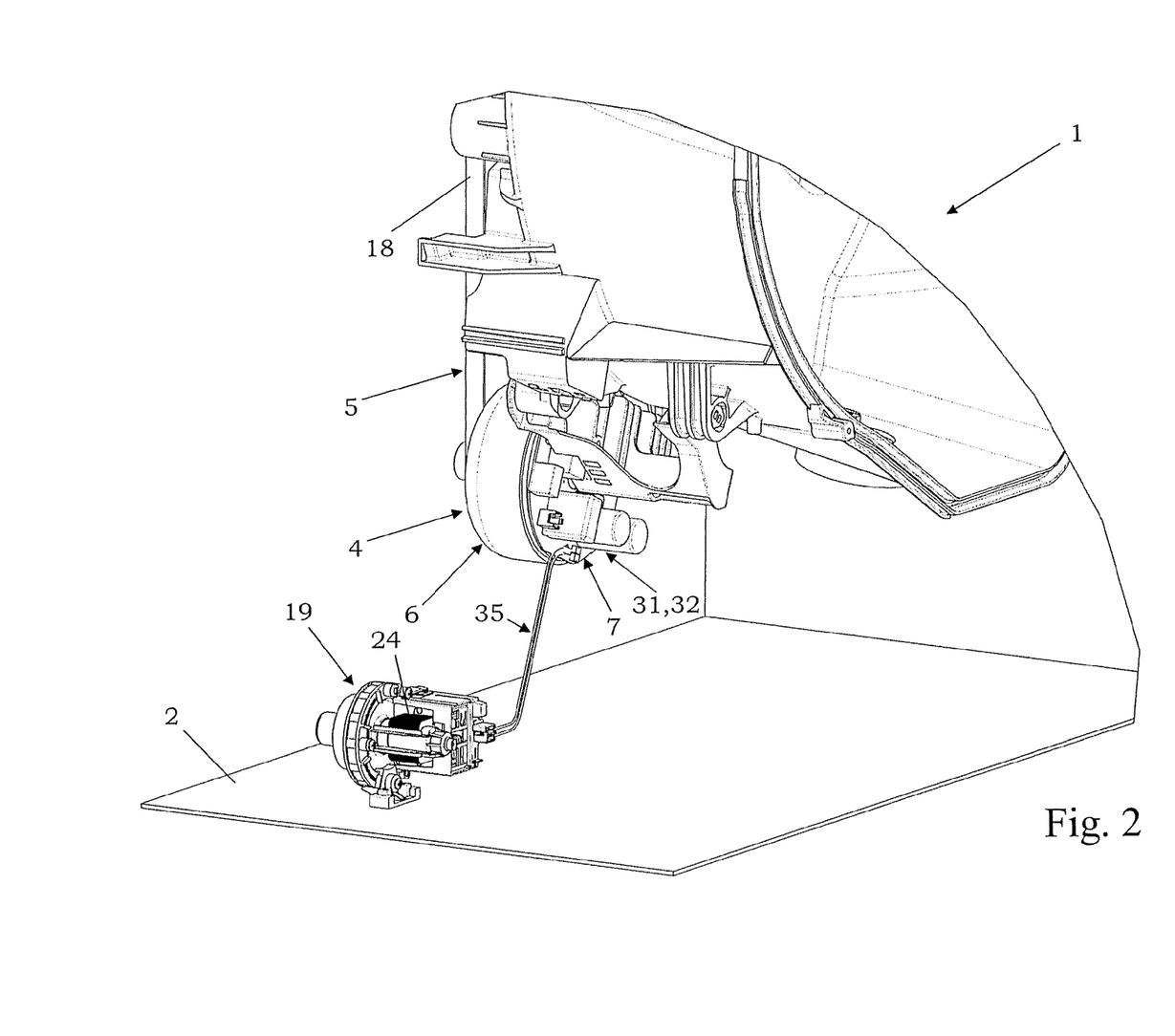
FIG. 2 shows an angled enlarged perspective view of the washing machine of FIG. 1.
Figure 3:
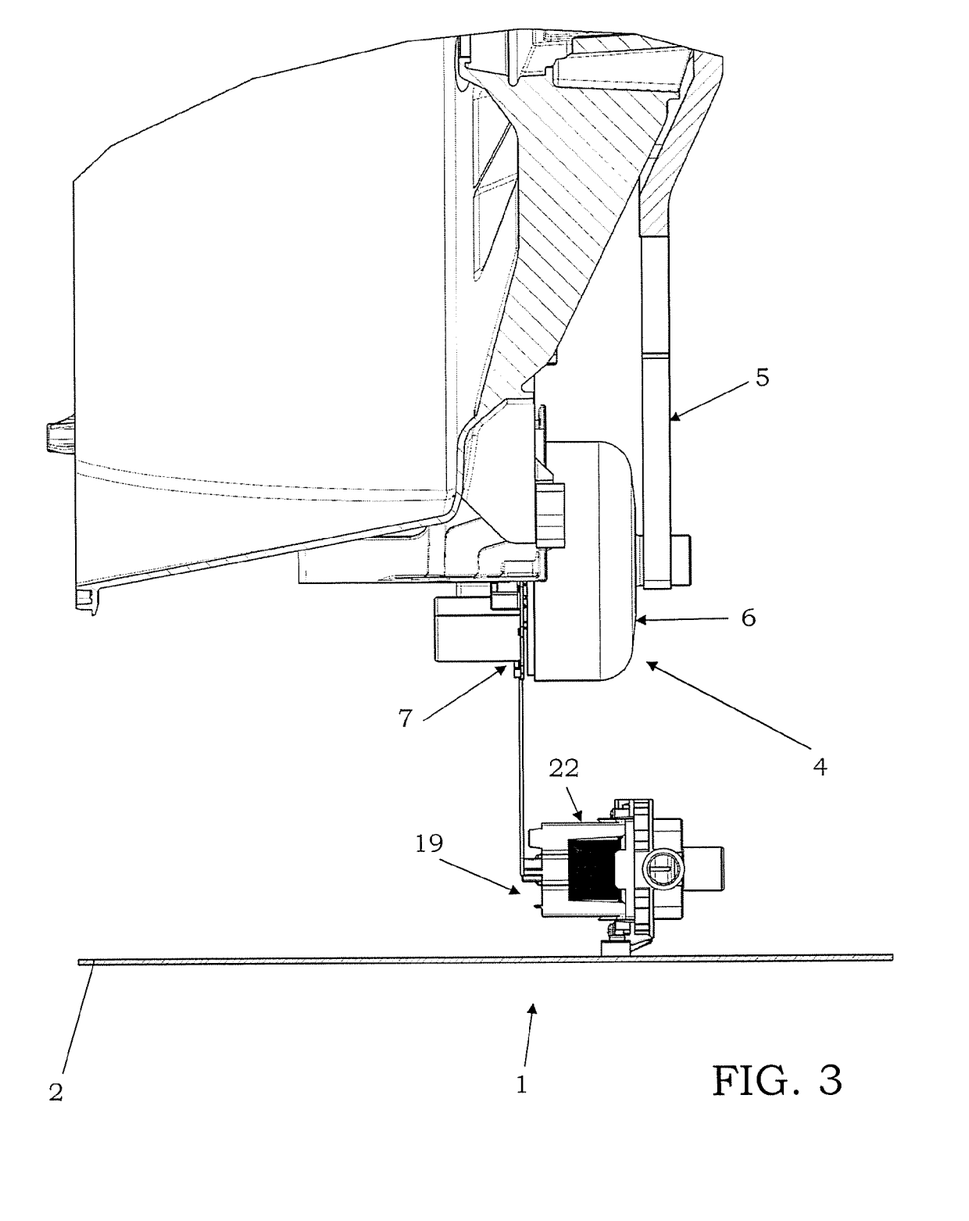
FIG. 3 shows a side section view of the washing machine of FIG. 1.
Figure 4:
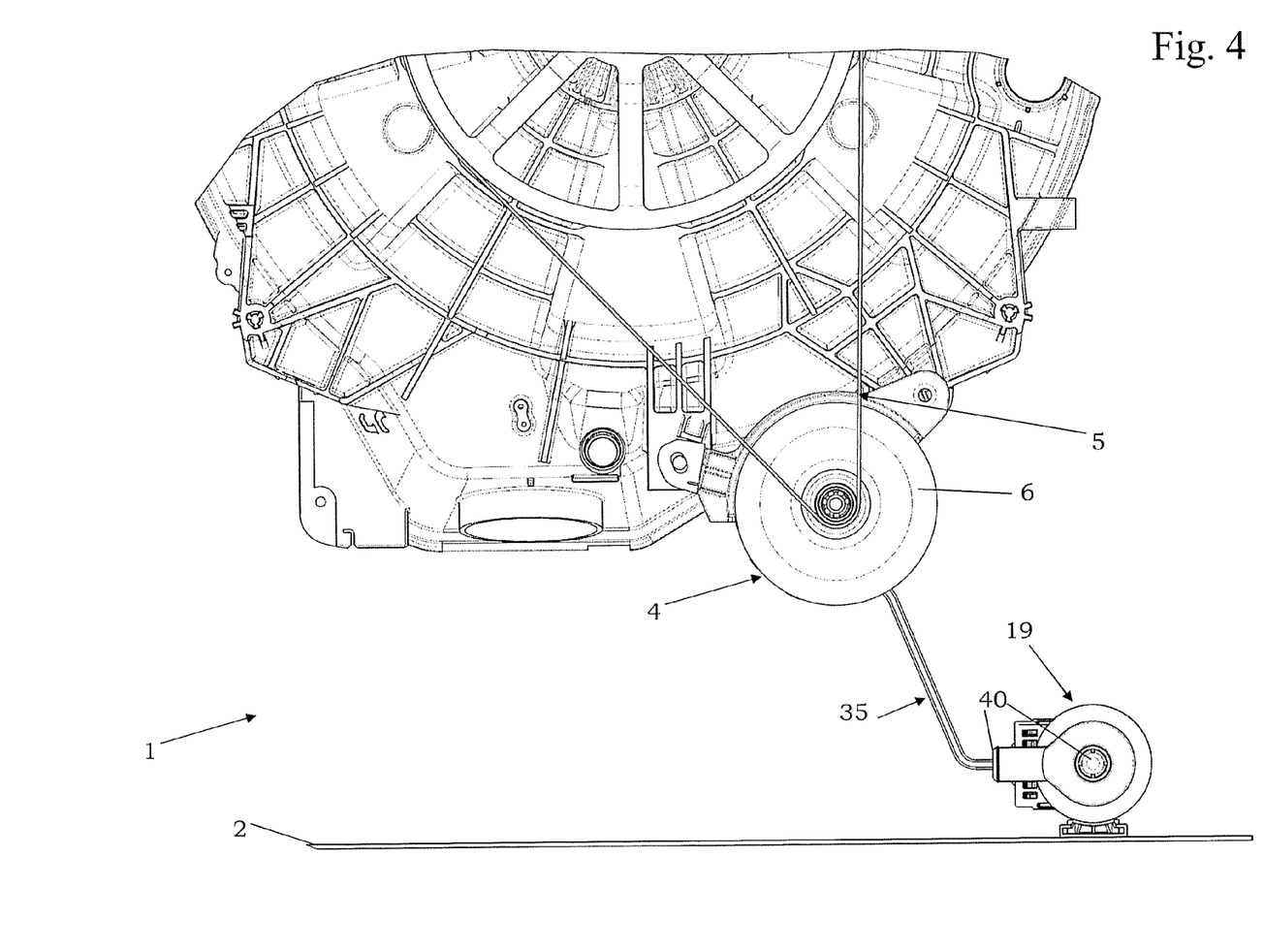
FIG. 4 shows a front view from the rear of the washing machine of FIG. 1.
Figure 5:
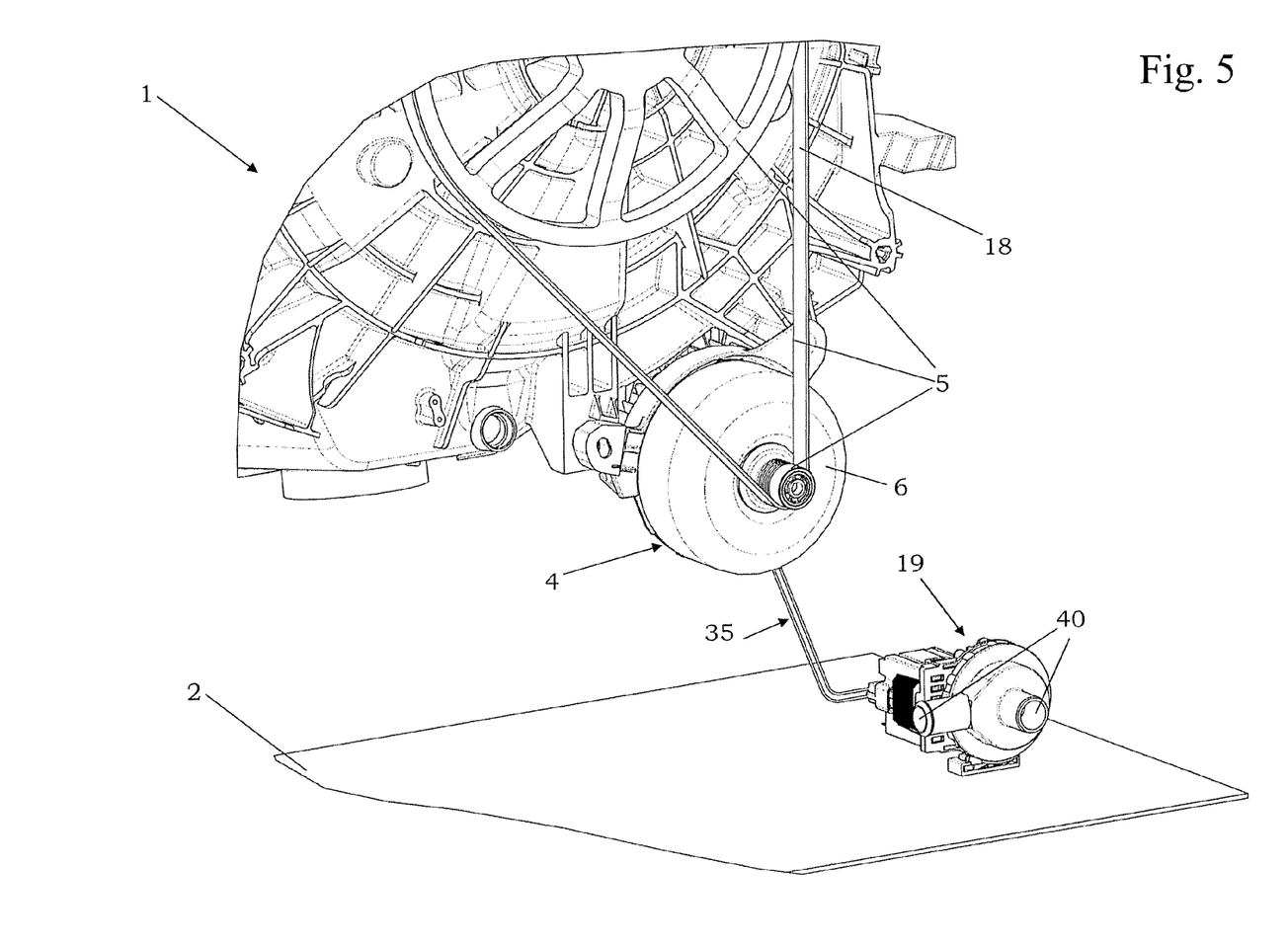
FIG. 5 shows a perspective view from the rear of the washing machine of FIG. 1.

The kinematic belt/pulley coupling 5 comprises the pulley 11 and a belt 18, which is in contact peripherally with the pulley 11 and is able to make the washing drum 3 rotate.

The washing machine also comprises a discharge electric pump 19 actuated by a synchronous electric motor 20 with external stator 22 and internal rotor 21 of the type with permanent magnets able to actuate an impeller 23, which is coupled with the internal rotor 21; the impeller 23 is inserted into a hydraulic circuit, able to make dirty water flow out towards a waste water network. Only the fittings 40 of the hydraulic circuit forming part of the discharge electric pump 19 are illustrated.

The external stator 22 of the discharge electric pump 19 comprises windings wound around polar expansions 24; in this way, it is possible to make the internal rotor 21 of the discharge electric pump 19 rotate by the action of the magnetic fields induced by the windings 25 that interact with the permanent magnets of the internal rotor of the electric pump 19.

The washing machine 1 also comprises a power supply circuit 29 comprising power cables connected to a mains electric network 30 at 220V in single-phase alternating current.

The washing machine 1 also comprises command means 26 that are accessible to a user, such as keys, knobs, levers and ring nuts for the user to input commands.

Such command means 26 act as inputs for an electronic programming and command circuitry 27, for example a microprocessor device, which is able to send command signals towards the aforementioned control circuitry 32 of the pulley motor 4. Therefore, the programming and command circuitry 27 is able to request to the control circuitry 32 that the washing operations be performed with relative movement of the clothes drum.

According to the invention, the electronic control circuitry 32 is configured to also control the discharge electric pump 19, and in particular the electric pump motor 20.

Advantageously, the electronic power circuitry 31 comprises a secondary inverter 34 that is able to actuate the rotor 21 of the electric pump 19.

This is possible through a cabling 35 connected to an output of the secondary inverter 34, and to an input of the windings 25 of the electric pump 19. In this way, therefore, the windings 25 induce a magnetic field that is controlled by the electronic control circuitry 32 through the secondary inverter 34.

The present embodiment illustrates two deactivation switches 37, or pass-transistors, controlled by control circuitry 32 so as to allow or prevent the passage of current from the inverters 36, 34 towards the respective windings 15, 25.

Advantageously, the control circuitry 32 is capable to control two inverters, and thus two rotors.

The control circuitry 32 is a microprocessor device comprising outputs for controlling the main inverter, secondary inverter and a connection with the programming and command circuitry 27, so as to be reached by the commands input by the user.

In this way, the electronic control circuitry 32 is the main element for controlling the operation of the washing machine 1, with clear advantages in terms of simplicity of construction.

The washing machine 1 is made up of the following:

command means 26 and programming and command circuitry 27 arranged in a top-front position, so as to be easily reached by a user;

electric pump 19 in bottom-rear position;

pulley electric motor 4 in a substantially bottom-rear position, arranged just above the electric pump 19.

It should be noted that the washing machine 1 does not need a specific power cable for the electric pump 19 and nor does it need a connection between the electronic programming and command circuitry 27 and the electric pump 19, which becomes like a pure and simple slave of the pulley electric motor 4.

The reduction of the necessary cabling leads not only to a need for less components, but above all leads to a simplification of the washing machine, both at the production stage and in operation, which means less possibilities of malfunctions and therefore greater reliability.

What's more, in this way the presence of expensive electronic power circuitry in the electric pump 19 is reduced as much as it can be.

Moreover, the presence of electronic control circuitry is kept to the bare minimum, which in this way is not necessary inside the electric pump 19: thus, it becomes necessary to have insulators, transformers, stabilisers and rectifiers to take the voltage to 12V as required by the microprocessor limited to the pulley electric motor 4 excluding the electric pump 19.

What's more, the fact that the electronic programming and command circuitry 27 no longer necessarily has to be connected with the electric pump 19 allows a more efficient and rational use of the connection between the electronic programming and control circuitry 27 and the electronic control circuitry 32, which would otherwise be underused.

All of this is even further enhanced by the fact that, in this way, the discharge electric pump 19 can have no heat dissipater, which is a bulky and undesired component, and it is only present at the level of the pulley electric motor 4, where it is represented with 70.

According to the invention, the control circuitry 32 executes the following three software programs:

a first software program to command the operations of the washing machine based upon the commands imparted by the electronic programming and control circuitry 27;

a second software program, able to be activated by the first software program, to control the pulley electric motor 4, so as to control the motion of the external rotor of the pulley electric motor 4 and basically the movement of the washing drum 3;

a third software program, able to be activated by the first software program, for controlling the electric pump 19, so as to control the motion of the internal rotor 21 of the electric pump 19 and consequently manage the discharge flow of the dirty water towards the water mains.

The third software program is present in the control circuitry 32, and this represents an advantage compared to the prior art, in which two electronic circuitries would be necessary, each programmed with its own software program.

The invention also concerns an actuation system 41 for a washing machine, comprising the aforementioned pulley electric motor 4 and the discharge electric pump 19.

Such an actuation system 41 comprises a single power supply input from the mains network 30 and just the pulley electric motor 4 is connected to said mains network 30.

Thus, not only is it possible to see the simplicity that can be achieved through the invention, but also the modular possibility of the actuation systems according to the invention: indeed, in this way, the producer of actuation systems must produce both the pulley electric motor and the electric pump 19 and provides them to the producer of the washing machine 1, so as to enormously simplify the production process and add an unaccustomed level of cohesion between the electrical components of the washing machine.

The invention claimed is:

1. An actuation system for a washing machine, comprising:
   a pulley electric motor for the actuation into rotation of a washing drum, comprising a rotor and a stator, wherein said pulley electric motor incorporates electronic power circuitry for actuating a rotor; and
   a discharge electric pump for discharging washing water, wherein said discharge electric pump is spaced apart from said pulley electric motor,
   electronic power circuitry comprising a main inverter for actuating the rotor of said pulley electric motor and a secondary inverter for actuating said discharge electric pump;
   electronic control circuitry for controlling said electronic power circuitry so as to control said rotor and said discharge electric pump;
   wherein both the electronic power circuitry and the electronic control circuitry are mounted on board of the stator of said pulley electric motor.

2. The actuation system according to claim 1, wherein a power supply from an external network is plugged into just the pulley electric motor.

3. The actuation system according to claim 1, wherein the pulley electric motor is of the synchronous type with permanent magnets.

4. The actuation system according to claim 1, wherein said rotor is of the external type.

5. The actuation system according to claim 1, wherein a single heat dissipater is provided at the pulley electric motor for dissipating the heat of both the main inverter and the secondary inverter.

6. The actuation system according to claim 1, wherein the electronic control circuitry and the electronic power circuitry are supported by a stator board that acts as a cover to close the stator of the pulley electric motor.

* * * * *